(No Model.)
T. THORP.
OPTICAL INSTRUMENT FOR TESTING DIAMONDS.
No. 574,588. Patented Jan. 5, 1897.
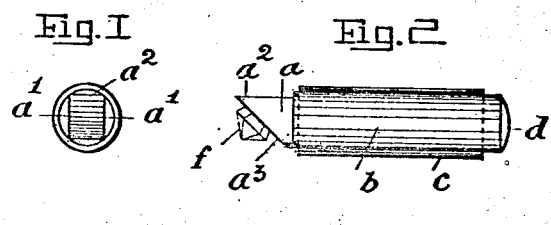
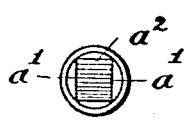
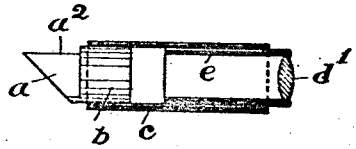
Attest
George H. Needof
E. C. Thompson
Inventor
Thomas Thorp
By Edward P. Thompson
Atty

UNITED STATES PATENT OFFICE.

THOMAS THORP, OF WHITEFIELD, ENGLAND.

OPTICAL INSTRUMENT FOR TESTING DIAMONDS.

SPECIFICATION forming part of Letters Patent No. 574,588, dated January 5, 1897.

Application filed July 20, 1895. Serial No. 556,573. (No model.)

*To all whom it may concern:*

Be it known that I, THOMAS THORP, a subject of the Queen of Great Britain, and a resident of Whitefield, near Manchester, in the county of Lancaster, England, have invented certain new and useful Improvements in Optical Instruments for Testing Diamonds, of which the following is a specification.

This invention consists in the construction of an optical instrument having for its object the testing of cut diamonds and the detection of imitation diamonds or "paste" when cut and set as brilliants.

The construction of the said instrument is based upon the following optical principles:

As is well known among physicists, when light passes from one refractive medium to another possessing greater refractive properties some of the light incident upon the latter medium is reflected into the former and renders the form of the reflecting-surfaces visible when looked at through the former medium. Where light passes from one medium to another having the same refractive power, no light is reflected, but all is transmitted through the second medium, which is thus invisible when looked at through the first.

In the case where light passes from a higher to a lower refractive medium there is an angle from the normal, known as the "critical" angle, beyond which no light is transmitted, but all is reflected into the higher medium, and prisms of glass whose angle exceeds the critical angle are known as "totally-reflecting" prisms.

Now as the refractive power of the diamond greatly exceeds that of any other known crystal or medium used in imitation of the diamond a considerable amount of light is reflected from its surface, so that it remains quite visible when immersed in or looked at through a medium which renders ordinary crystals or paste invisible, or nearly so.

The improved instrument based upon the principles stated above is shown on the drawings in two modified forms of construction.

Figure 1 shows an end view, and Fig. 2 a sectional side view, of the same; Figs. 3 and 4, similar views of a modified form thereof.

In carrying out my invention I make use of a reflecting-prism, a totally-reflecting one being the most efficient, which prism $a$ is preferably formed by cutting one end of a short glass rod $b$ at an angle of about forty-five degrees to the axis and grinding the sides $a'$ and face $a^2$ flat, though this is not indispensable. The reflecting-surface $a^3$ is polished, and the sides and face of the prism or the glass rod round the end cut at an angle are preferably ground dull, so as to diffuse the light falling upon the reflecting-surface $a^3$, and the glass rod beyond the prism is coated with black or inclosed in a tube $c$ to exclude other light. At the other end of the glass rod a lenticular surface or lens $d$ may be formed, as shown by Figs. 2 and 3, the focus of the lens being at or about the center of the reflecting-surface $a^3$, or instead thereof a lens $d'$, Fig. 4, may be fixed in the end of a tube $e$, sliding in the tube $c$, into which the glass rod $b$, which in this case is made shorter and cut square at the end, is inserted, so that the surface $a^3$ can be accurately focused.

The object of the lens or lenticular surface is to magnify the crystals inspected through the instrument, and the end of the glass rod may be cut and polished flat and square to the axis if the crystals to be tested are sufficiently large not to require magnification.

In order to test a crystal $f$ with an instrument constructed as hereinbefore described, one of its facets is placed directly against the polished inclined surface $a^3$, moistened previously with a little liquid, preferably with one having a high refractive index, such as cedar or cassia oil, but water will suffice when the user is accustomed to the instrument. In case the crystal is a diamond considerable light will be seen reflected from the facet touching the prism, and when viewing it through the lenticular end of the instrument the facet will be very distinctly seen, showing brightly with sharp outlines, whereas if the crystal is paste or other substance used in imitation of diamonds the facet will be scarcely distinguishable from the surrounding medium in which it is immersed and appear without any distinct outlines.

I claim as my invention—

1. An optical instrument for testing diamonds, consisting of the combination of a totally-reflecting prism, a tube of opaque material extending from one of the side faces of the prism, and a magnifying-lens within the tube.

2. An optical instrument for testing diamonds, consisting of the combination of a totally-reflecting prism, a tube of opaque material extending from one of the side faces of the prism, and a magnifying-lens within the tube, said lens being adjustable to and from the prism.

In testimony whereof I have hereunto set my signature in the presence of two witnesses.

THOMAS THORP.

Witnesses:
R. J. URQUHART,
CARL BOLLÉ.